(12) United States Patent
Beeren et al.

(10) Patent No.: US 7,503,591 B2
(45) Date of Patent: Mar. 17, 2009

(54) SPRAY BAR ASSEMBLY CONDUIT

(75) Inventors: Joseph M. Beeren, Horst (NL); Casper Grotenbreg, Horst (NL)

(73) Assignee: John Deere Fabriek Horst B.V., Horst (NL)

( * ) Notice: Subject to any disclaimer, the term of this patent is extended or adjusted under 35 U.S.C. 154(b) by 429 days.

(21) Appl. No.: 11/231,922

(22) Filed: Sep. 21, 2005

(65) Prior Publication Data

US 2006/0076776 A1 Apr. 13, 2006

(30) Foreign Application Priority Data

Oct. 13, 2004 (DE) .................... 10 2004 049 847

(51) Int. Cl.
   *B05B 1/20* (2006.01)
(52) U.S. Cl. .................. 285/305; 239/159; 239/267; 239/726
(58) Field of Classification Search .......... 285/252, 285/374, 404, 242, 239, 305; 239/159, 267, 239/726
See application file for complete search history.

(56) References Cited

U.S. PATENT DOCUMENTS

| | | | |
|---|---|---|---|
| 3,655,164 A | 4/1972 | Hayes | 251/347 |
| 4,456,180 A * | 6/1984 | Lury | 239/397 |
| 4,570,980 A * | 2/1986 | Goward | 285/305 |
| 4,603,890 A * | 8/1986 | Huppee | 285/239 |
| 4,735,365 A * | 4/1988 | Smeller et al. | 239/735 |
| 4,850,621 A * | 7/1989 | Umehara | 285/322 |
| 5,261,709 A * | 11/1993 | McNaughton et al. | 285/319 |
| 5,425,557 A * | 6/1995 | Bartholomew | 285/242 |
| 5,601,317 A * | 2/1997 | Crouse et al. | 285/242 |
| 5,833,007 A | 11/1998 | Guyot et al. | 169/54 |
| 5,964,483 A * | 10/1999 | Long et al. | 285/305 |
| 6,053,427 A * | 4/2000 | Wilger et al. | 239/159 |
| 7,066,402 B2 * | 6/2006 | Goebel et al. | 239/170 |

FOREIGN PATENT DOCUMENTS

| | | |
|---|---|---|
| DE | 34 39 522 A1 | 10/1984 |
| EP | 1 316 752 A1 | 6/2003 |
| FR | 2 438 193 | 10/1978 |

* cited by examiner

*Primary Examiner*—David E Bochna

(57) ABSTRACT

A spray bar assembly conduit having a connecting area easily attachable to a connecting piece. The connecting area includes a first outwardly directed bead which contacts the connecting piece and a second inwardly directed bead. The connecting piece is preferably equipped with a connecting plug or locking device for securing the connecting piece axially in the connecting area with the connecting plug engaging with the first bead.

7 Claims, 2 Drawing Sheets

SPRAY BAR ASSEMBLY CONDUIT

FIELD OF THE INVENTION

The invention relates to a conduit for a spray bar assembly and, more particularly, to a pipe having a connecting area.

BACKGROUND OF THE INVENTION

In the state of the art, spray bar assemblies are known which comprise pipe conduits. The pipes feature connecting areas equipped with connections often referred to as quick-coupling unions. The quick-coupling unions include, for example, a hose nozzle or a connecting piece pushed onto a coupling piece that is connected by gluing or the like with the pipe. The coupling piece features a snap ring groove, which can receive a plug or a cotter pin. The hose nozzle is secured axially to the coupling piece by the plug or cotter pin. Such spray bar assemblies are used for instance on agricultural sprayers of Deere & Company as shown in the brochure "John Deere Trailed Field Sprayers [translated], 824-832-840"; page 18, printing ID: YY0314750D, dated October 2003.

The connection of the coupling piece to the pipe by gluing or welding or the like presents a problem since the procedure is time-consuming and requires a high degree of manufacturing effort.

BRIEF DESCRIPTION OF THE INVENTION

The challenge constituting the basis for the invention is providing an improved conduit for a spray bar assembly of the type mentioned above which overcomes the problems cited above.

A spray assembly conduit of the type mentioned above is so designed that the connecting area of the pipe is formed at least with a first bead. The bead may be in the form of a shaped dimple which is preferably formed over the entire circumference of the pipe and which represents a ring-shaped bulge or indentation towards the exterior or interior respectively. The pipes may be thin-walled and can be shaped by simple pressing or deformation processes. Plastic pipes may also be used which include a bead provided by an appropriate deformation process or in an injection molding process. The formed beads provide a bulge on the outside of the pipe with an indentation on the inside of the pipe, or vice versa. The shape of the first bead may have contours that are similar to the grooves or rings applied to the connecting pieces known in the state of the art, so that the connecting area of the pipe may take the shape of a coupling piece over a certain area. Because the bead in the connecting area of the pipe, expensive connections with coupling pieces can be avoided. A connecting piece can be fastened directly to the connecting area. Consequently, parts can be saved and the assembly or the manufacturing effort for the conduit can be simplified.

The bead represents a raised area in the form of a ring-shaped bulge which extends over the entire circumference of the connecting area of the pipe. Preferably the bead is formed on a side away from an aperture of the pipe in such a way that it has a surface area or that it presents an abrupt change of diameter on the outside of the pipe. The bead which is shaped by transforming the connecting area of the pipe may, for instance, also be in the form of a ring-shaped step on the outside of the connecting area.

The bead is preferably incorporated radially in an outward direction to the longitudinal axis of the pipe. It is also possible to incorporate the bead radially in an inward direction to the longitudinal axis of the pipe, so that a channel or snap-ring groove is formed on the outside of the pipe which also has a surface area.

The connecting area may be provided with one or several additional beads which are preferably arranged between the first bead and an aperture of the pipe and that are orientated towards the inside. The additional beads are shaped so that a snap-ring groove is formed on the outside of the pipe. It is also possible to orientate one or several of these beads toward the outside. Also, a snap-ring groove may be formed through two beads that are orientated towards the outside.

A bead placed between the first bead and the aperture can receive a gasket. Here it may be helpful to arrange several beads with gaskets, in order to increase the imperviousness of the connecting area.

The connecting area of the pipe is preferably received by a connecting piece which encompasses the connecting area over its entire circumference and which can engage the first bead. Through the engagement with the first bead, the connecting piece can be fixed axially and possibly also radially. An interior diameter of the connecting piece and an exterior diameter of the bead can be matched to each other to provide a press fit and form a seal over a circumference of the connecting area. An interior surface of the connecting piece may also be shaped such that it enters into contact with a gasket provided in an additional bead so that a seal is formed between the connecting piece and the connecting area of the pipe. Introducing the second or additional bead between the aperture and the first bead creates a particularly simple and inexpensive sealing arrangement for the connecting area.

The connecting piece may, for instance, be a hose or an elastically deformable conduit which is pushed over the connecting area and forms a press fit with the first bead. A tension ring or a hose clamp or similar device may be provided for securing this connection whereby the hose can be further secured axially on the pipe, preferably behind the first bead (starting from the opening of the pipe).

The connecting piece may also be in the form of a hose nozzle, for instance similar to that provided for state of the art quick-couplings. However, other possibilities include hose nozzles with a cylindrical inner surface and which receive the connecting area of the pipe, where the inner surface can enter into contact with the first bead or with a seal.

The hose nozzles may be equipped with connectors which can be attached, for example, to a hose. The connectors may be straight or angular. Several side by side connectors are also conceivable, for instance as a T-piece forming a branching or a switch.

A connecting piece may also be shaped as a connecting element of two connecting areas, so that both exits and entrances of the connecting piece are shaped alike. Furthermore the connecting piece may also be in the form of a switch, a multi-coupling or distributor, so that several connecting areas of different pipes can be connected with each other.

The connecting piece may also be in the form of an end piece so that a conduit as per the invention can be closed off with such a connecting piece. Such end pieces may for example be used as the end of a sprayer line in a spray bar assembly.

The connecting piece is preferably equipped with a connecting plug or locking device. The connecting plug may be used to secure the connecting piece axially in the connecting area, with the connecting plug engaging with the first bead.

The connecting plug may be in the shape of a socket pin, a cotter pin or a clip. For example, a wire or a plastic plug or plastic loop may be guided or kept on the connecting piece by drilled holes. The device can contact the bead as soon as the connecting piece is pushed into the connecting area. The connecting plug may be made of metal, plastic or another suitable material. The connecting plug locks the connecting piece on the connecting area by being seated at the first bead. The connecting piece can be moved axially or can be pulled off the connecting area only after the connecting plug has been detached.

The design of the connecting area and the multiple design possibilities of connecting pieces, a conduit in accordance with the invention makes it possible to produce a modular design of the complete conduit apparatus of a sprayer.

A conduit as per the invention may be provided with output apertures or outlets for egress of a liquid to be sprayed such as for distribution over the plantings of a field. The output apertures may be distributed over the width of a spray bar assembly along the conduit. Preferably the output apertures are in the form of nozzles or are equipped with nozzles so that atomization, spray patterns and output rate can be changed, such as by adjusting or changing nozzles.

A conduit according to the invention is used for example as an agricultural sprayer for the purpose of distributing a liquid over a spray bar assembly or sprayer boom. Such a sprayer arrangement can be pulled by a tractor, or a sprayer attachment can be mounted on the tractor. Agricultural sprayers may also be designed as self-propelled vehicles. Also conceivable is the design of a conduit according to the invention in the form of an agricultural sprayer as a distributing machine for fertilizer.

The drawings show an embodiment of the invention on the basis of which the invention as well as further advantages and advantageous further developments and embodiments of the invention shall be explained and described in greater detail in the following.

DESCRIPTION OF THE PREFERRED EMBODIMENT

Figure 1:
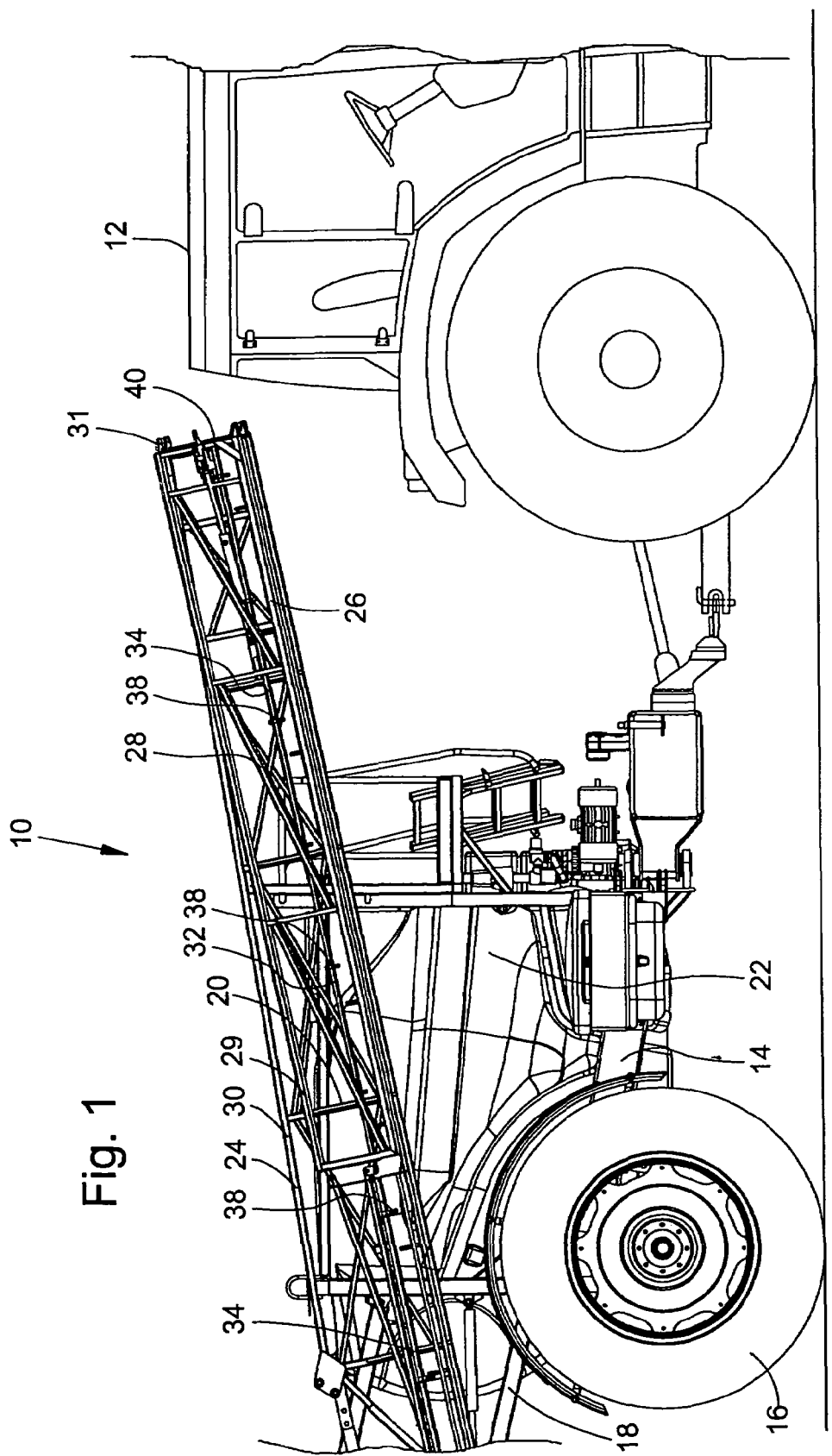
FIG. 1 is a side view of an agricultural sprayer with a spray bar assembly featuring a conduit according to invention.

FIG. 1 shows an agricultural sprayer 10 in the form of a trailed sprayer pulled by a tractor 12. The sprayer 10 features a frame 14 with wheels 16. On the frame 14 an assembly of parallel bars 18 is mounted which supports a sprayer bar assembly or boom 20. The sprayer frame 14 also supports a tank 22.

The sprayer bar assembly 20 features upper and lower supports 24, 26 which are interconnected by numerous braces 28 forming a trelliswork. The sprayer bar assembly 20 includes several sections 29, 30 which are interconnected via hinges 31 and extend on both sides of the sprayer 10. The hinges 31 facilitate folding of the sprayer bar assembly 20 into a position suitable for transportation (as shown in FIG. 1) and unfolding of the assembly into an operating position.

The sprayer bar assembly 20 supports conduits 32 extending on both sides of the sprayer 10 along its length. The conduits 32 feature pipes 34 which have output openings 38 in the form of nozzles. The pipes 34 are connected to supply and return hoses (not shown) which supply the liquid to be sprayed from the tank 22 to the pipes 34, and from the pipes 34 to the tank 22 respectively.

The pipes 34 feature connecting areas 40 where the pipes 34 are connected with each other and/or with the supply and return hoses, as shown in detail in FIGS. 2 to 7.

Figure 2:
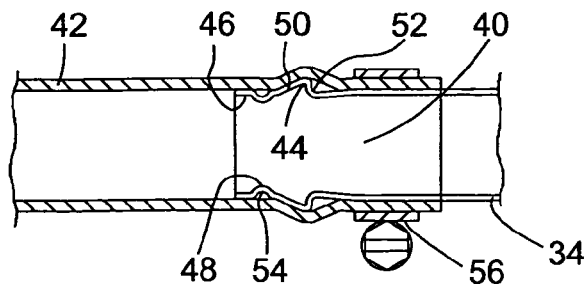
FIG. 2 is a cross section of a connection of a connecting area of conduit with a hose.

FIG. 2 shows a design example according to invention for a connection of pipe 34 or of the connecting area 40 with a connecting piece 42 in the form of a hose. The connecting area 40 of the pipe 34 features a first bead 44 extending towards the exterior radially to the longitudinal axis of the pipe 34 over the entire circumference of the connecting area 40, and an opening 46. Between the opening 46 and the first bead 44 a second bead 48 is formed which extends over the entire circumference of the connecting area 40. The connecting piece 42 has an inside diameter which corresponds essentially to the outside diameter of the opening 46. The first bead 44 is slanted or tapered on the side toward the opening so that the outside diameter slowly increases within a transition area. The opposite side the bead 44 features a steep transition, thereby creating a ring area 52 extending radially to the longitudinal axis of the pipe 34. The second bead 48, in contrast to the first bead 44, is directed towards the inside and extends radially to the longitudinal axis of the pipe 34 and features a symmetrical course, thereby creating on the outer surface of the connecting area 40 a uniform ring groove 54 which extends radially toward the inside. Furthermore the connecting piece 42, looking from the opening 46 behind the first bead 44, is provided with a hose clamp 56. The connection is made by pushing the connecting piece 42 over the connecting area 40 and by establishing its contact with the first bead 44, because the piece 42 is expanded by the bead 44, thereby exerting a corresponding contact pressure on the bead 44. The connecting piece 42 is fixed on the connecting area by this contact pressure. Additionally the connecting piece 42 is secured by the hose clamp 56.

Figure 3:
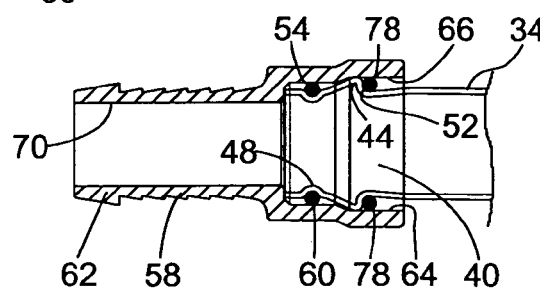
FIG. 3 is a cross section of a connection of a connecting area of conduit according to invention in an additional example of the design with a connecting piece in the form of a hose nozzle.
Figure 4:
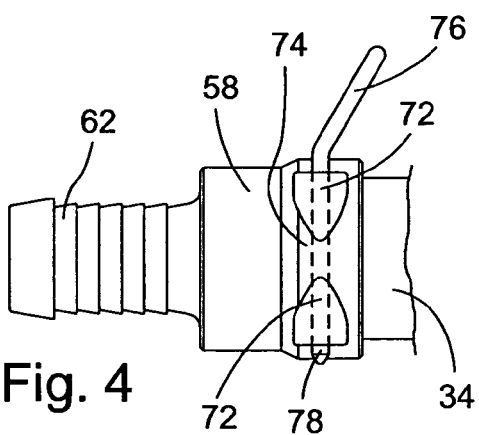
FIG. 4 is a top view of the connection shown in FIG. 3.
Figure 5:
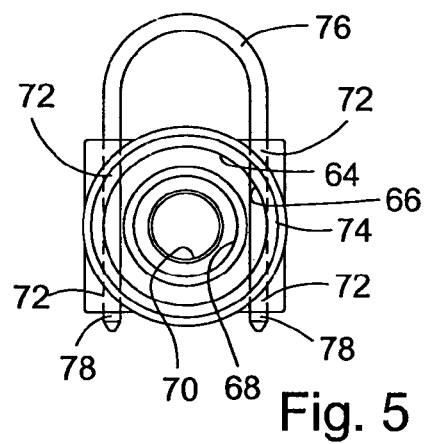
FIG. 5 is a front view of the connecting piece shown in FIGS. 3 and 4.

FIGS. 3 to 5 show another design example, representing a connection between the connecting area 40 and a connecting piece 58 in the form of a hose nozzle. The shape of the connecting area 40 and, respectively, the form and location of the beads 44, 48 is similar to that of the above FIG. 2 design example. Furthermore a gasket 60 is provided here which is seated in the ring groove created by the second bead 48. The connecting piece 58 features a connecting end 62 where a hose (not shown) or the like can be attached. The connecting piece 58 has an opening 64 with a first diameter 66 on the outside that corresponds approximately to the outside diameter of the first bead 44. Adjacent thereto the opening 64 decreases to a second diameter 68 which is slightly smaller than the outside diameter of the gasket 60. Then the opening decreases to a third diameter 70 which is approximately equal to the inside diameter of the connecting end 62.

Within the area of the first diameter 66, on both sides of the opening 64, opposing drilled holes 72 are made which extend perpendicularly and tangentially to the longitudinal axis of the pipe through a wall 74 of the opening 64. Also, a connecting plug or lock 76 in the form of wire or plastic U-clamp with two parallel limbs or legs 78 is provided. The connecting piece 58 is pushed onto the connecting area 40, and thereby the inside of the connecting piece 58 enters into contact with the gasket in the area of the second diameter 68 and seals the connecting area 40 to the outside. The connecting piece 58 is pushed onto the connecting area until the drilled holes 72 reach behind the first bead 44, so that that the connecting plug 76 with its legs 78 can be pushed through the drilled holes 72 and to contact the first bead 44. Contact between the connecting plug 76 and the bead 44 is made so that the limbs 78 rest against the ring area 52 formed at the first bead 44, as soon as the connecting piece 58 and the connecting area 40 are pushed apart. The contact of the limbs 78 on the ring area 52 serves to axially secure the connecting piece 58.

Figure 6:
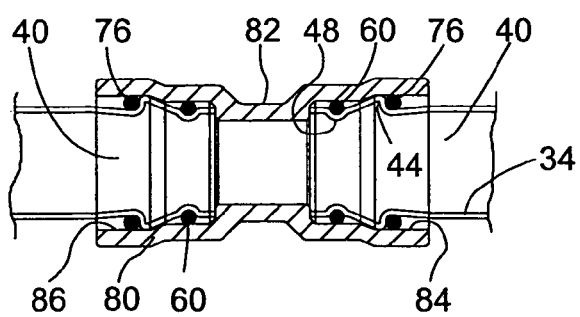
FIG. 6 is a cross section of a connection of two connecting areas of a conduit according to invention in an additional example of the design with a connecting piece in the form of a connecting plug.

FIG. 6 shows another design example, representing a connection between the connecting areas 40 of two pipes 34 and a connecting piece 80 formed as a connecting piece or union. The shape of the connecting areas 40 and the shape and location of the beads 44, 48 and of the gaskets 60 respectively, are similar to that of the preceding design example (FIGS. 3 to 5). The connecting piece 80 is shaped so that in comparison to the preceding design example no connecting end is provided. The connecting piece 80 has instead a connecting pipe 82, which connects two laterally reversed openings 84, 86 with each other. The openings 84, 86 are shaped similarly to the opening 64 of the preceding design example. The connecting piece 80 thus connects two pipes each having a shaped connecting area 40. The pipes are sealed to the outside by the gaskets 60. The connecting plugs 76 serve to secure the connection.

Figure 7:
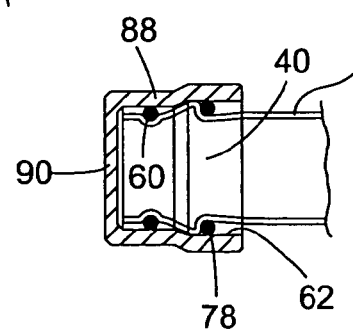
FIG. 7 is a cross section of a connection of a connecting area of conduit according to invention in an additional example of the design with a connecting piece in the form of an end piece.

FIG. 7 shows another design example, representing a connection between the connecting area 40 of a pipe 34 and a connecting piece 88 shaped as an end piece. The design of the connecting area 40 and the shapes and locations of the beads 44, 48 and of the gaskets 60 respectively, are similar to the preceding design examples (FIGS. 3 to 6). The connecting piece 88 is shaped so that in comparison to the preceding design examples of FIGS. 3 to 5, the connecting end 62 is closed by an end plate 90. In this manner it is possible to seal the pipe 34 or the end area 40 respectively, to the outside by means of the gasket 60 and the end plate 90 and to close them with the connecting plug 76.

Even though the invention has been described only by means of four design examples, the expert will be able to see, in light of the preceding description as well as the drawing figures, many different alternatives, modifications and variants which fall under the present invention.

We claim:

1. Agricultural sprayer spray bar assembly for the distribution of liquid to plants, the spray bar assembly comprising a conduit extending along a length of the spray bar assembly, the conduit having an end with a connecting area, the connecting area having first and second axially spaced beads, the beads directed in opposite radial directions relative an axis of the conduit to form an outward bead with a ramped leading portion and a stepped trailing portion and an inward bead, and at least two of the following alternatively connectible to the connecting area:
   a. a first connecting piece comprising a flexible hose, the flexible hose slidable over the ramped leading portion and the inward bead and expanded over the outward bead;
   b. a second connecting piece secured over the outward bead, and a gasket sealing between the stepped trailing portion and the second connecting piece;
   c. a union receivable over the first and second beads, and a union lock contacting the first bead to secure the union to the connecting area, and a gasket sealing between the union and the second bead; and
   d. an end plug and an end plug gasket sealing between the end plug and the second bead, and an end plug lock contacting the first bead to secure the end plug to the connecting area.

2. The sprayer bar assembly as set forth in claim 1 wherein the second connecting piece further comprises an apertured portion, and a locking member having a leg received in the aperture portion and secured against one of the beads to lock the second connecting piece onto the conduit.

3. The sprayer bar assembly as set forth in claim 2 wherein the leg is secured against the outward bead.

4. The sprayer bar assembly as set forth in claim 1 wherein at least one of the connecting pieces comprises a pipe having a spray nozzle.

5. Agricultural sprayer spray bar assembly for the distribution of liquid to plants, the spray bar assembly comprising a conduit extending along a length of the spray bar assembly, the conduit having an axis and an end with a connecting area, the connecting area being generally cylindrical and non-corrugated and having inward and outward beads spaced axially, the beads directed in opposite directions relative the axis and forming a ramped leading portion extending axially inwardly from the outward bead and a stepped trailing portion, the stepped trailing portion being steeper than the ramped leading portion extending from the inward bead, a connecting piece secured over the outward bead and having an apertured locking end extending axially inwardly beyond the stepped trailing portion, a gasket seated in the inward bead sealing between the connecting area and the connecting piece, and a locking member having at least one leg received in the apertured locking end, the leg secured against the stepped trailing portion to lock the connecting pieces onto the conduit.

6. The spray bar assembly as set forth in claim 5 wherein the inward and outward beads each have a radius, and wherein the radius of the inward bead is different than the radius of the outward bead.

7. The spray bar assembly as set forth in claim 6 wherein the apertured locking end of the connecting piece has an inner diameter different than an inner diameter of a portion of the connecting piece adjacent the gasket.

* * * * *